Figure 1:
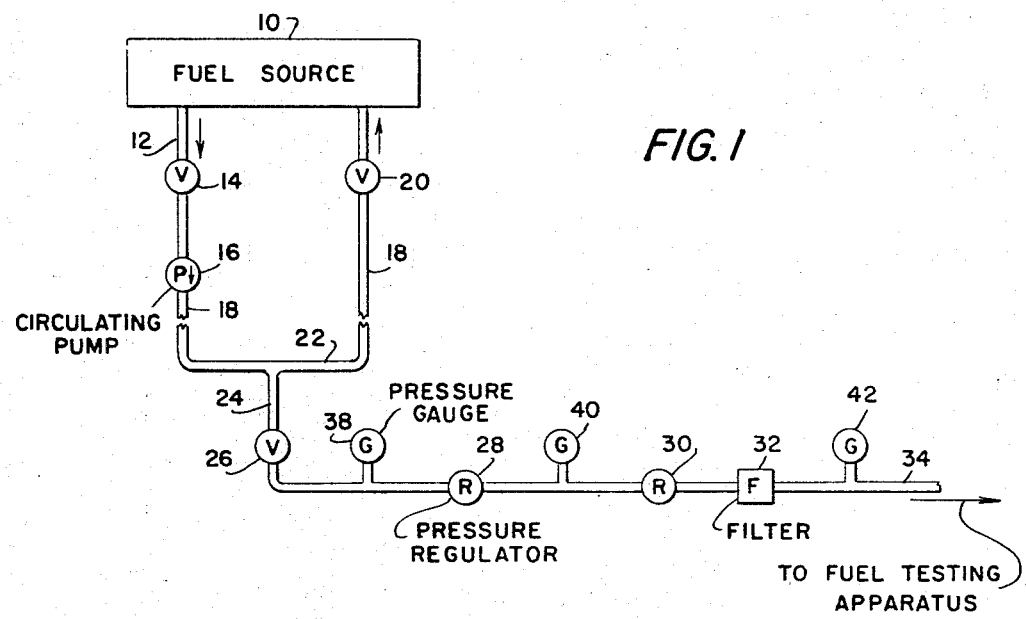

INVENTORS
ALFRED E. TRAVER
GEORGE A. MACDONALD

United States Patent Office 3,274,985
Patented Sept. 27, 1966

3,274,985
FUEL SUPPLY SYSTEM
Alfred E. Traver, Great Neck, and George A. MacDonald, Floral Park, N.Y., assignors to Mobil Oil Corporation, a corporation of New York
Filed Mar. 19, 1965, Ser. No. 444,918
6 Claims. (Cl. 123—139)

This is a continuation-in-part of application Serial No. 267,145, filed March 22, 1963, now abandoned, for "Fuel Supply System."

This invention relates to fuel supply systems and, more particularly, to a system for automatically supplying automotive fuel to a test engine.

In the testing of automotive fuels, it is oftentimes necessary to locate the testing apparatus remotely from the source of fuel. In such cases, and in those instances where the fuel cannot conveniently be withdrawn manually from the fuel source and delivered by hand to the testing apparatus, it is necessary to provide a fuel supply system for automatically supplying fuel from the source to the testing apparatus. This expedient is virtually essential when a test engine, for example, of the type disclosed in American Society for Testing Materials, ASTM Manual for Rating Motor Fuels by Motor and Research Methods (4th ed., 1960), is automated and used to monitor continuously a fuel product. Automated test engines of this type are single-cylinder internal-combustion laboratory test engines adapted to facilitate monitoring of a characteristic of the fuel supplied thereto and are disclosed in the copending Beal and Traver applications Serial Nos. 160,051 and 160,052, respectively, both filed December 18, 1961, for "Apparatus for Determining the Combustion Quality of a Fuel" and "Automated Engine for Determining the Combustion Quality of a Fuel," respectively, and both assigned to the assignee of the present application.

In such a fuel supply system, it is desirable to supply the fuel to the test apparatus as quickly as possible. This is necessary in those cases where the test apparatus is employed to monitor the quality of a product stream and to control the blending of the stream's components or the output flow of the stream, for example. In such instances, any appreciable delay introduced by the fuel supply system may result in an appreciable amount of off-specification product being produced or allowed to flow as an output product before the deviation from specification is corrected.

In the present invention, there is provided a fuel supply system which automatically and rapidly supplies fuel to testing apparatus, such as a test engine, from a fuel source remote from the engine. Briefly, a first conduit is coupled to the fuel source and is provided with a circulating pump which circulates fuel through the conduit at a relatively high flow rate. A portion of the conduit is positioned close to the test engine and is coupled to the liquid-level-control means for the carburetor of the engine by a second conduit. The second conduit includes one or more pressure regulators which reduce the fuel flow rate to that suitable for application to the liquid-level-control means for the carburetor of the test engine. The second conduit and liquid-level-control means for the carburetor together form part of means connecting the fuel source and the engine proper. In this fashion, and due to the high flow rate in the first conduit, fuel is supplied to the engine virtually immediately after it is withdrawn from the fuel source, yet at a rate suitable for the liquid-level-control means for the carburetor by virtue of the pressure regulators.

Normally, it would be possible to connect the second conduit to the standard ASTM engine carburetor assembly, with its typical float chamber and float assembly for controlling the fuel level in the chamber and thus the fuel-air ratio of the combustible mixture supplied to the engine. This expedient, however, is unsatisfactory for a number of reasons. First, the volume of fuel in the float chamber is sufficiently large that an appreciable and objectionable time lag is introduced between the withdrawing of a sample of the fuel from the fuel source and its actual application to the test engine. Second, relatively large gas bubbles tend to form in the horizontal and downwardly extending tube that connects together the float bowl and the gauge glass of the ASTM carburetor assembly. Such relatively large gas bubbles displace appreciable amounts of fuel and vary the fuel-air ratio of the combustible mixture sufficiently to cause erratic engine operation.

Accordingly, the invention incorporates a novel carburetor arrangement or assembly comprising a chamber of relatively small size into which the fuel from the second conduit is introduced. To determine the fuel level in the chamber, and thus the fuel-air ratio, an overflow arrangement is utilized, which conveniently may be adjustably positioned, so that fuel is drained from the chamber whenever it exceeds a predetermined level determined by the position of the overflow arrangement. The flow rate of the fuel in the second conduit is chosen to be sufficiently greater than the rate of fuel consumption by the test engine that the chamber is continuously filled to the level of the overflow arrangement and a certain amount of fuel continuously overflows, while the remainder is supplied to the engine.

Additionally, in the carburetor arrangement, a portion of the second conduit adjacent to the chamber is inclined upwardly towards the chamber, thereby allowing small bubbles of gas which form and are lighter than the liquid fuel displaced thereby to rise rapidly. These bubbles are thus not allowed to collect and form still larger bubbles, but rise and pass outwardly into the fuel chamber wherein they break through the surface of the fuel and enter into the gas space above the fuel in the chamber, thereby having little effect on the fuel-air ratio of the combustible mixture.

Figure 2:
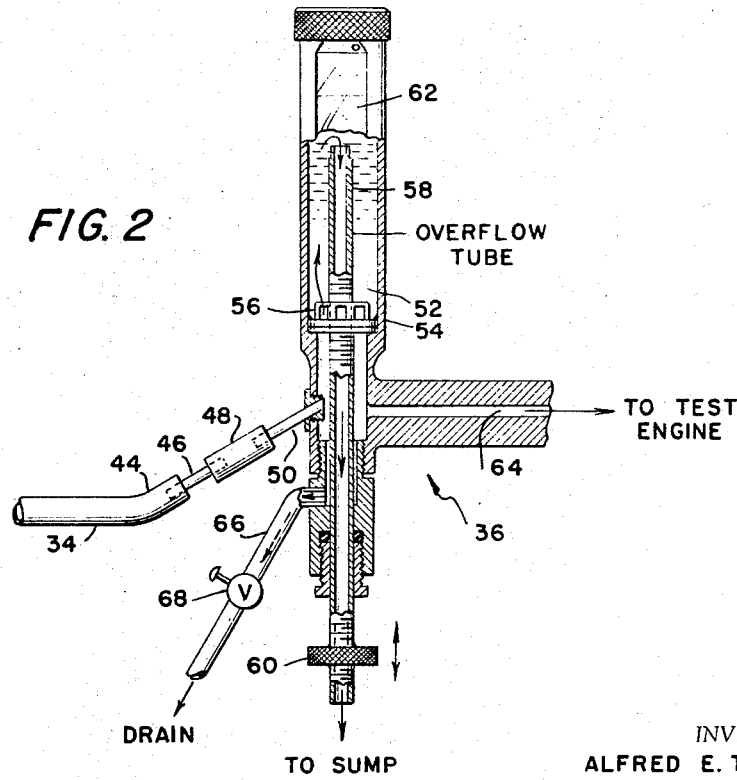

A detailed description of a fuel system according to the invention follows, which is to be read in conjunction with the appended drawings in which:

FIG. 1 is a block diagram of a fuel supply system in accordance with the invention; and FIG. 2 is a partly sectional view of a liquid-level-control means forming part of a carburetor assembly in accordance with the invention.

Referring to FIG. 1, a fuel source 10, such as a pipeline, for example, has coupled thereto a conduit 12. A valve 14 controls the flow of fuel through the conduit 12 to a high speed circulating pump 16. A conduit section 18 couples the pump 16 to the fuel source 10 through a valve 20.

A portion 22 of the conduit section 18 passes in close proximity to the testing apparatus (not shown) which tests the fuel in the source 10. The conduits or conduit sections 12, 18, 22 constitute the "first conduit" referred to above and serve as fuel-movement means substantially devoid of fuel-stagnation means for withdrawing fuel from the fuel source 10 and moving it at substantially uniform velocity past a location close to the engine to which the fuel is to be supplied.

Connected to the conduit section 22 is a conduit 24 which couples the section 22 through a valve 26 to a first pressure regulator 28. The pressure regulator 28 is, in turn, coupled to another pressure regulator 30, the output of which is connected to a filter 32 which filters the fuel to remove particles of dirt and other foreign matter therefrom. The filter is connected by a conduit 34 to the testing apparatus; in the case of a standard ASTM-CFR test engine, the conduit 34 is connected to the liquid-level-control means 36 shown in FIG. 2, which forms part of a carburetor assembly and will be described hereinafter.

In operation, the valves 14, 20, and 26 are opened and the high speed circulating pump 16 is actuated to circulate fuel from the source 10 at a relatively high-flow-rate, i.e., at a rate substantially greater than the rate at which fuel is consumed by the engine, through the conduit section 22 close to the testing apparatus. This flow rate is sufficiently rapid that fuel is applied from the source 10 to the conduit section 22 with very little time lag. The conduit 24 receives a portion of this rapidly circulated fuel and applies it to the pressure regulators 28 and 30 which reduce the flow rate of the fuel passing therethrough to a value substantially less than that of the flow rate of the fuel in the conduit 12 and sufficiently low for suitable application to the liquid-level-control means 36 of the testing apparatus. It has been found that two regulators in series, as shown in FIG. 1, provide a relatively constant output flow rate for a wide range of input flow rates. Pressure gauges 38, 40, and 42 provide an indication of the action of the regulators 28 and 30.

In a typical installation, the length of the high-flow-rate conduit 12, 18 between the fuel source 10 and the T junction of the conduit section 22 and the conduit 24 may be about 100 feet, and the length of the low-flow-rate conduit between the T junction and the fuel testing apparatus may be about 3 feet. The high-flow-rate conduit may comprise 1" piping through which the pump 16 pumps fuel at the rate of about 10' per second or about 0.4 gallon per second, and the low-flow-rate conduit connected thereto may comprise piping ranging between ¼" and ⅛" or less through which the fuel travels at the rate of about 24 milliliters per minute, or at a flow rate less than one three thousandths the flow rate through the high-flow-rate conduit. In order to realize the advantages of this aspect of the invention, the high flow rate should be at least 100 times the low flow rate.

As may be noted, then, the apparatus of FIG. 1 operates to supply a quantity of fuel from the fuel source 10 as rapidly as possible to the conduit 34 leading to the testing apparatus at a rate suitable for handling by the liquid-level-control means 36 of the testing apparatus.

Referring now to FIG. 2, which shows in detail the liquid-level-control means 36 to be used in conjunction with the standard ASTM-CFR testing engine and the automated engines of the Beal and Traver applications referred to above, for example, the conduit 34 from the pressure regulators 28 and 30 of FIG. 1 leads into an upwardly inclined conduit section 44. A metering tube 46, such as a capillary tube, for example, controls the flow of fuel into the liquid-level-control means. The tube 46 is coupled by another inclined conduit section 48 and an inclined inlet tube 50 to a relatively small volume chamber 52 formed by a substantially cylindrical member 54. The conduits, conduit sections, or tubes 24, 34, 44, 46, 48, 50 constitute the "second conduit" referred to above. Fluid is allowed to build up in the chamber 52, passing through a perforated nut 56, until it reaches the level of an overflow tube 58 which is coupled to a sump (not shown) and which drains away the excess fuel. The overflow tube 58 is threaded through the nut 56 and is thus adjustable upwardly or downwardly by rotating a knurled knob 60 attached to the tube to vary the fuel level in the chamber 52. The fuel level may be observed through a sight glass 62. An outlet 64 from the chamber 52 applies the test fuel to the carburetor proper (not shown) of the test engine, and the fuel-air ratio of the combustible air-fuel mixture applied to the engine is determined by the level of the fuel in the chamber. A drain 66 positioned at the bottom of the chamber 52 and controlled by a shut-off valve 68 is used to drain the chamber when desired.

The small volume chamber 52 and the overflow tube 58 provide a novel liquid-level-control means useful in testing applications, since the small volume of fuel necessary to fill the chamber to the level of the overflow tube provides little delay in the supplying of fuel from the source 10 of FIG. 1 to the test engine. In use, the rate of fuel flow into the chamber 52 is chosen to be slightly greater than the rate of fuel flow through the outlet 64 to the test engine, so that the chamber 52 is always filled to the level of the overflow tube 58 and a small quantity of fuel drains through the overflow tube to the sump.

In the inclined conduit sections 44 and 48 and metering tube 46 and inlet tube 50, small bubbles of gas which have formed in the conduit section 34 pass rapidly upwardly, since the volume of liquid displaced by each gas bubble is heavier than the bubble itself. In this fashion, the small gas bubbles are not allowed to accumulate into fewer but larger size bubbles, which would result if the conduit sections were not inclined, and instead they are quickly passed into the chamber 52 where they break through the surface of the fuel therein and enter the gas space above the fuel, which is open to the atmosphere. Thus, the detrimental effect upon engine operation caused by large bubbles, i.e., erratic engine operation resulting from the changing fuel-air ratio caused by such large bubbles, is completed avoided. Small bubbles, dissipated rapidly, displace insignificant volumes of fuel and have virtually no effect upon the fuel-air ratio.

As may be noted, a novel fuel supply system has been described which supplies fuel rapidly to a testing engine at a constant but easily varied fuel-air ratio. It is apparent that numerous modifications of the apparatus specifically disclosed will suggest themselves to persons skilled in the art. Accordingly, the invention should not be limited to the form shown in the drawings and described in the specification, but should be taken to be defined by the following claims, in which the "first rate" is the rate at which fuel is supplied to the engine through, for example, the outlet 64; the "second rate" is the rate at which fuel is withdrawn from the fuel source 10 by, for example, the conduit 12, 18, 22; and the "third rate" is the rate at which the fuel moves from the fuel-movement means 12, 16, 22, 18 to the liquid-level-control means 36 through, for example, the conduit 24, 34, 44, 46, 48, 50.

We claim:

1. In a fuel supply system for supplying a liquid fuel at a first rate to an engine from a source of supply remote from the engine, the combination of fuel movement means substantially devoid of fuel-stagnation means for withdrawing fuel from the source of supply and moving it at substantially uniform velocity past a location close to the engine at a second rate faster than the first rate, a chamber, coupling means coupling together the fuel-movement means at said location and the chamber for supplying liquid fuel to the chamber at a third rate intermediate the first and second rates, the coupling means including a first conduit having a portion thereof inclined upwardly in the direction of fuel flow to facilitate the passing of bubbles of gas therethrough into the chamber, the chamber including a gas space above the normal level of liquid fuel therein to receive the gas bubbles, an outlet from the chamber for supplying fuel from the chamber to the engine, and overflow means for conveying away from the chamber liquid fuel therein that exceeds a predetermined level.

2. In a fuel supply system for supplying a fuel at a first rate to the carburetor of an engine from a source of supply remote from the engine, the combination of a first conduit having a portion thereof in close proximity to the test engine, the ends of the first conduit making fluid connection with the source of supply, means for circulating fuel from the source of supply through the first conduit at a second rate substantially greater than the first rate, liquid-level-control means for the carburetor, a second conduit in fluid connection with the portion of the first conduit in close proximity to the test engine and coupling said portion to the liquid-level-control means, and rate regulating means for reducing the rate of flow of fuel through the second conduit from the second rate to a third rate substantially less than the second rate and greater than the first rate.

3. Apparaus as recited in claim 2, wherein the rate regulating means comprises at least two pressure regulators in series connection in the second conduit.

4. Apparatus as recited in claim 2, wherein the fuel is a liquid and the second conduit includes a portion thereof that is inclined upwardly in the direction of fuel flow to facilitate the passing of bubbles of gas therethrough and the liquid-level-control means includes a chamber coupled to the second conduit for receiving the fuel, the chamber including both a gas space above the normal level of liquid fuel to receive the gas bubbles therein and an outlet for supplying fuel to the carburetor, and overflow means for conveying away from the chamber liquid fuel therein that exceeds a predetermined level.

5. In a system for supplying fuel from a source of supply to a liquid-level-control means and thence to a single-cylinder test engine employed to monitor the quality of a product stream, the engine being remote from the source of supply and requiring that fuel be supplied thereto at a first rate, the improvement comprising high-speed fuel-movement means substantially devoid of fuel-stagnation means for withdrawing fuel from the source of supply and moving it to a location close to said liquid-level-control means at a second rate substantially greater than said first rate, and means coupling together the fuel-movement means at said location and said liquid-level-control means for supplying fuel to said liquid-level-control means at a rate at least as great as said first rate.

6. A system as set forth in claim 5 in which said second rate is at least 100 times greater than said first rate.

References Cited by the Examiner
UNITED STATES PATENTS

| | | | |
|---|---|---|---|
| 719,536 | 2/1903 | Tuttle | 261—72 |
| 806,460 | 12/1905 | Bucklin | 123—132 |
| 1,025,814 | 5/1912 | Lemp | 123—132 |
| 1,196,552 | 8/1916 | Laporte | 123—139.16 |
| 2,044,412 | 6/1936 | Weiertz | 123—132 |
| 3,161,700 | 12/1964 | Ball | 103—150 |

FOREIGN PATENTS

| | | |
|---|---|---|
| 931,260 | 10/1947 | France. |
| 137,679 | 1/1920 | Great Britain. |

LAURENCE V. EFNER, *Primary Examiner.*